June 22, 1943.   J. FEHER   2,322,230
CAN TESTING MACHINE
Filed April 8, 1941
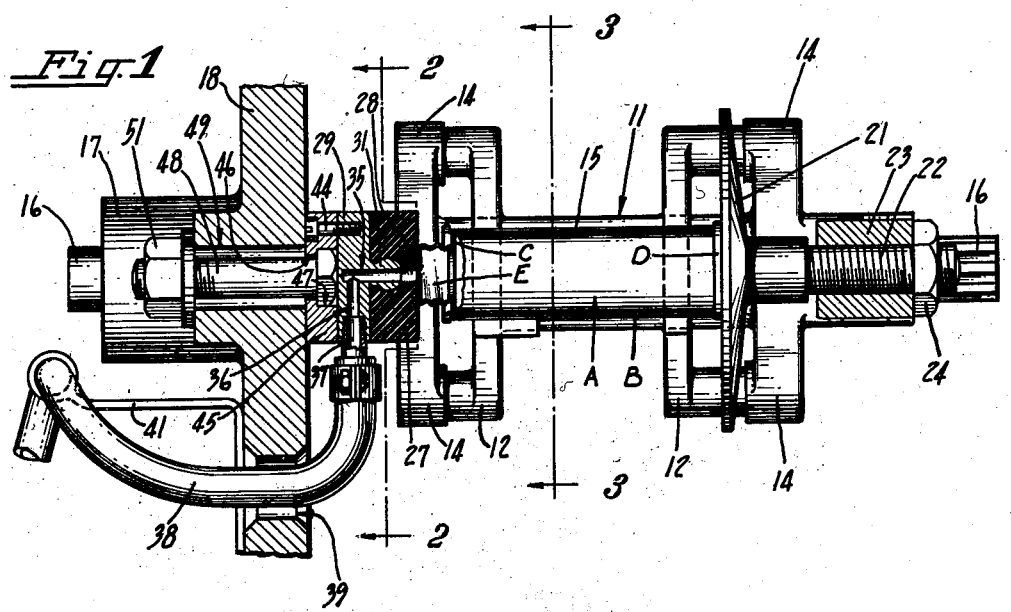
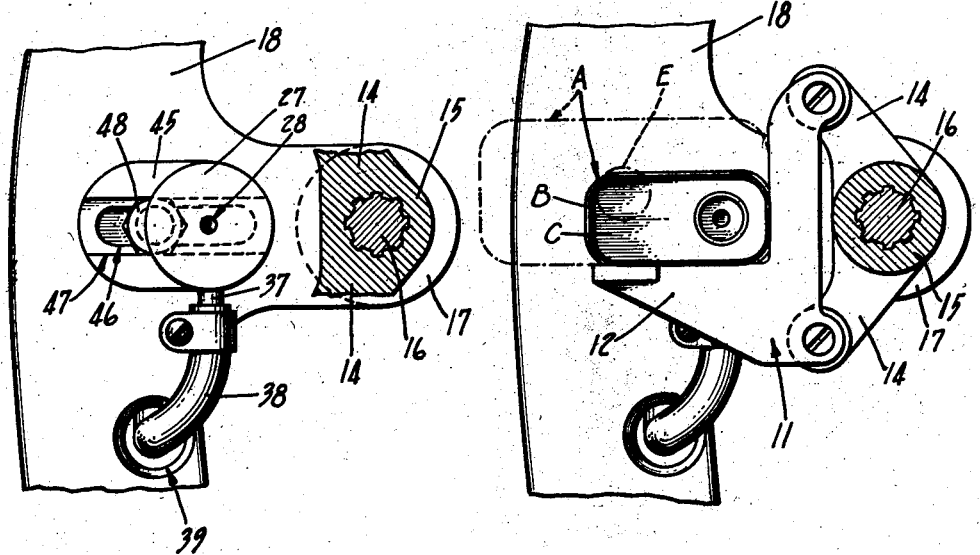
INVENTOR
Joseph Feher
BY
ATTORNEYS Patented June 22, 1943

2,322,230

UNITED STATES PATENT OFFICE 2,322,230

CAN TESTING MACHINE

Joseph Feher, North Arlington, N. J., assignor to American Can Company, New York, N. Y., a corporation of New Jersey Application April 8, 1941, Serial No. 387,519

4 Claims. (Cl. 73—51)

The present invention relates to container or can testing machines and has particular reference to testing cans having varied nozzle locations.

In the manufacture of sheet metal cans of the oblong or rectangular character used for insecticides and the like, a nozzle with a removable screw cap is usually provided for dispensing purposes. The various products and their dispensing characteristics dictate the position of the nozzle which therefore has varied locations, both in the same size can and in different sizes of cans.

In testing such nozzle cans for leaks in automatic machinery various sets of change parts for holding the can in the proper place in respect to its nozzle are required for the various sizes of cans and their varied nozzle locations. This means that each time a batch of cans are to be run through the machine, the change parts of the machine must first be changed over to the new location of the nozzle of the cans to be tested. Such a change over usually requires considerable time and labor which ultimately adds to the cost of the can.

The instant invention contemplates overcoming these difficulties by providing a movable mounting for the testing rubber against which the nozzle of the can to be tested fits during the testing operation, so that the testing rubber may be readily and quickly adjusted to suit the varied locations of the can nozzle thereby eliminating the necessity of change parts.

An object therefore of the invention is the provision, in a can testing machine for nozzle type cans, of devices for sealing off the interior of the can to be tested wherein the usual rubber seal against which the nozzle of the can fits during the testing operation, is movable into various positions to correspond to the varied locations of the nozzles on different cans, so that change parts for the cans may be eliminated with a consequent considerable saving in time and labor.

Numerous other objects and advantages of the invention will be apparent as it is better understood from the following description, which, taken in connection with the accompanying drawing, discloses a preferred embodiment thereof.

Referring to the drawing:

Figure 1 is a sectional view of a portion of a testing machine embodying the instant invention, the view showing a can to be tested in place in a testing head, with parts broken away; and Figs. 2 and 3 are sectional views taken substantially along the respective lines 2—2 and 3—3 in Fig. 1, with parts broken away.

As a preferred embodiment of the invention the drawing illustrates a testing head of a can testing machine of the character disclosed in United States Patent 2,019,517, issued November 5, 1935, to M. E. Widell on Can tester. In such a machine cans A to be tested are clamped against rubber sealing pads which seal off the interior of the cans. Air under pressure then is introduced into the cans to detect leaking cans from non-leaking cans.

In the instant invention the cans A to be tested are preferably of the character having a rectangular body B with top and bottom closures C, D, respectively, secured thereto in suitable end seams. The top closure C carries a filling and dispensing nozzle E.

A can A is received in the machine in a cradle 11 which includes a pair of spaced and parallel carriers 12 on which the can rests in a horizontal position. The carriers are bolted to arms 14 formed on a long hub 15 slidably supported on a horizontal splined shaft 16. One end of the shaft is secured in a boss 17 formed on a rotatable testing wheel 18. The hub 15 is shifted periodically on the shaft 16 by any suitable means operating in time with the other moving parts of the machine.

The cradle 11 also carries a clamp plate 21 mounted on a stud 22 which is threaded into a boss 23 formed on the outer end of the long hub 15. A locknut 24 on the outer end of the stud holds the clamp plate in place. The locknut and the threaded stud provide for adustment of the clamp plate relative to the boss 23.

When the cradle 11 is shifted toward the left as viewed in Fig. 1, the clamp plate 21 engages against the bottom end D of the can A in the cradle and this action pushes the can endwise thus bringing the nozzle E on the opposite end of the can into tight engagement with a resilient sealing pad 27. This pad is made preferably of rubber and seals off the interior of the can for the testing operation.

The sealing pad 27 preferably is cylindrical in shape and is formed with a centrally located hole 28. The pad is carried on a metal disc or mounting plate 29 having a tubular stem or projection 31 which fits into the hole 28 in the pad and thus holds the latter in place. The disc 29 is formed with an air passageway 35 which extends through the stem 31 and which communicates with the hole 28 in the pad. This allows air under pressure to be introduced into the can by way of the nozzle E.

The passageway 35 also communicates with an angularly disposed channel 36 which leads from a flexible hose connection 37 threaded into the edge of the disc. A flexible hose 38 is secured to the connection 37 and extends through a clearance hole 39 in the tester wheel 18. This hose leads from any suitable source of compressed air. A bracket 41 secured to the tester wheel holds the hose in place.

The metal disc 29 which retains the sealing pad 27 is secured by screws 44 to an adjustable bracket plate 45. This plate is formed with an elongated slot 46 adjacent a stepped groove 47 formed in the outer face of the plate. The plate is secured in place by a bolt 48 the head of which fits in the plate groove 47 and is thus held against turning. The bolt extends through the slot 46 in the plate and through an enlarged hole 49 in the testing wheel. A washer and locknut 51 hold the bolt tight against movement.

Thus by merely loosening the locknut 51, the plate 45 may be shifted in any desired coplanar direction relative to the tester wheel 18 to bring the sealing pad 27 and its air hole 28 into the desired alignment for a particular location of a nozzle on a can A, in turn movably supported on its cradle 11. After such an adjustment the plate 45 is again locked by the nut 51 in its adjusted position.

With this construction of mounting for the sealing pad 27, the latter may be set easily and quickly in any desired position in accordance with the location of the nozzle on the cans to be tested. This eliminates the changing of any other parts of the machine. Fig. 3 of the drawing illustrates one such nozzle location of a can in full lines and another location of a nozzle in a larger size can which is shown in dot and dash lines.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a testing machine for cans having nozzles, the combination of a cradle for supporting cans of various sizes in a predetermined testing position, a resilient sealing pad carried by said machine and engageable by the nozzle of a can in said cradle in abutting relation only for sealing off the interior of the can so that it may be tested for leaks, and means for securing said resilient sealing pad on said machine for coplaner universal adjustability relative to said machine and to said can supporting cradle so as to be movable into various positions to correspond to the varied nozzle locations on different cans to be tested.

2. In a testing machine for cans having nozzles, the combination of a cradle for supporting cans of various sizes in a predetermined testing position, a resilient sealing pad carried by said machine and engageable by the nozzle of a can in said cradle in abutting relation only for sealing off the interior of the can so that it may be tested for leaks, a mounting on which said sealing pad is secured, means for securing said mounting on said machine for coplanar universal adjustability relative thereto and to said can supporting cradle, whereby to adapt said sealing pad to be shifted into various positions corresponding to the varied nozzle locations on different cans to be tested, and means for locking said mounting in an adjusted position.

3. In a testing machine for cans having nozzles, the combination of a cradle for supporting cans of various sizes in a predetermined testing position, a resilient sealing pad carried by said machine and engageable by the nozzle of a can in said cradle in abutting relation only for sealing off the interior of the can, a movable mounting on which said sealing pad is secured, means for securing said pad mounting on said machine for coplanar universal adjustability relative thereto and to said can supporting cradle, whereby to adapt said sealing pad to be shifted into various positions corresponding to the varied nozzle locations on different cans to be tested, and a flexible air hose connecting with said mounting, said mounting and said sealing pad having communicating passageways for conveying air under pressure from said hose to the interior of the can for testing the latter for leaks.

4. In a leak testing machine for cans having nozzles, the combination of a rotatable testing wheel, a cradle supported on said wheel for carrying cans of different sizes in a predetermined position for testing, a resilient sealing pad carried by said testing wheel and engageable by the nozzle of a can in said cradle in abutting relation only for sealing off the interior of the can to be tested, said sealing pad having a central aperture, a movable mounting having a projection fitting the aperture in said sealing pad for removably securing the pad to the mounting, said mounting having an elongated slot and an adjacent groove to permit coplaner universal adjustability of said mounting relative to said testing wheel and to said supporting cradle, whereby to permit said sealing pad to be aligned with each nozzle location in different cans to be tested, a bolt extending through the slot in the mounting and through an enlarged hole in the testing wheel for supporting the mounting, the head of said bolt being locked in the groove in said mounting, and a nut on said bolt for locking said mounting in an adjusted position on said testing wheel.

JOSEPH FEHER.